United States Patent [19]
Silverstein et al.

[11] 3,761,201
[45] Sept. 25, 1973

[54] HOLLOW TURBINE BLADE HAVING DIFFUSION BONDED THEREIN

[75] Inventors: Stanley M. Silverstein, Stratford; Victor Strautman, Trumbull, both of Conn.

[73] Assignee: Avco Corporation, Stratford, Conn.

[22] Filed: Aug. 27, 1971

[21] Appl. No.: 173,499

Related U.S. Application Data

[62] Division of Ser. No. 818,557, April 23, 1969, Pat. No. 3,626,568.

[52] U.S. Cl. .................... 416/232, 416/213
[51] Int. Cl. ................................ F01d 5/18
[58] Field of Search............. 29/156.8 H; 416/232, 416/96, 213

[56] References Cited
UNITED STATES PATENTS

| | | | |
|---|---|---|---|
| 3,026,605 | 3/1962 | Turner | 416/232 X |
| 3,481,024 | 12/1969 | Bunn | 29/473.5 |
| 3,487,530 | 1/1970 | Ely | 29/402 |
| 3,550,372 | 12/1970 | Craig | 416/96 UX |
| 3,574,482 | 4/1971 | Savage | 416/232 X |
| 3,626,568 | 12/1971 | Silverstein et al. | 416/232 X |

FOREIGN PATENTS OR APPLICATIONS

| | | | |
|---|---|---|---|
| 21,443 | 5/1956 | Germany | 416/96 |
| 680,014 | 10/1952 | Great Britain | 416/96 |

*Primary Examiner*—Everette A. Powell, Jr.
*Attorney*—Charles M. Hogan et al.

[57] ABSTRACT

This invention relates to turbine blades having diffusion bonded pins or inserts in the holes which are formed in the turbine blades during casting.

2 Claims, 3 Drawing Figures

PATENTED SEP 25 1973 3,761,201

*INVENTORS.*
STANLEY M. SILVERSTEIN
VICTOR STRAUTMAN
BY
ATTORNEYS.

HOLLOW TURBINE BLADE HAVING DIFFUSION BONDED THEREIN

This is a division of application Ser. No. 818,557 filed Apr. 23, 1969 now U.S. Pat. No. 3,626,568, dated Dec. 14, 1971.

BACKGROUND OF THE INVENTION

This invention relates to turbine blades and more particularly to turbine blades having diffusion bonded pins therein.

Undesirable hole or apertures are formed in the process of casting turbine blades, as a result of the holding fixtures required in the casting process. These holes must be plugged before the blades are usable. In the past, it has been the usual procedure to weld or braze plugs in the holes. The use of electron beam welding methods to secure the plug in the hole has been widely accepted. The welding and/or brazing steps are effective but, from a manufacturing standpoint, these methods are expensive and time-consuming because of the extra equipment facilities required to perform this function.

A further step in the manufacturing of the turbine blades is to provide a coating on the turbine blade to improve thermal fatigue and resistance to deterioration of the turbine blade when in use. Typical coating processes are shown in U. S. patent, Freeman et al., No. 3,155,536, issued Nov. 3, 1964; U. S. patent Baranow et al, No. 3,515,095, issued June 2, 1970; and U. S. patent application of Baranow, Ser. No. 686,852, filed Nov. 30, 1967.

It is an object of the present invention to provide a turbine blade at a considerable cost saving with respect to time and equipment needed for the bonding of pins in holes of the blades as compared to the previous methods of welding and brazing.

A further object of this invention is to provide turbine blades having diffusion bonded pins therein.

Other objects of the present invention will be apparent to those skilled in the art in view of the steps and procedures hereinafter described.

SUMMARY OF THE INVENTION

This invention describes tubrine blades having diffusion bonded inserts an insert in the holes formed in the blades from the holding fixtures used during the casting process. A pin or insert, having a coefficient of expansion greater than that of the blade, is placed in the holes and the resulting assemblage heated to a temperature wherein diffusion bonding of the insert to the blade takes place.

Other details, uses, and advantages of this invention will become apparent as the following description of the exemplary embodiment and method thereof presented in the accompanying drawings proceeds.

BRIEF DESCRIPTION OF THE DRAWINGS

The accompanying drawings show a present exemplary embodiment of this invention in which.

DETAILED DESCRIPTION OF THE INVENTION

Figure 1:
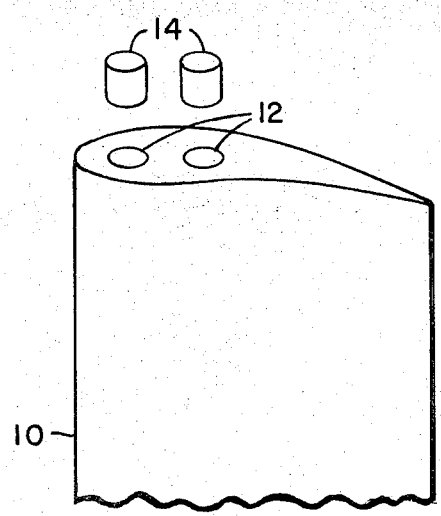
FIG. 1 is a perspective view of the invention prior to the insertion of the pin in the opening of the turbine blade.
Figure 2:
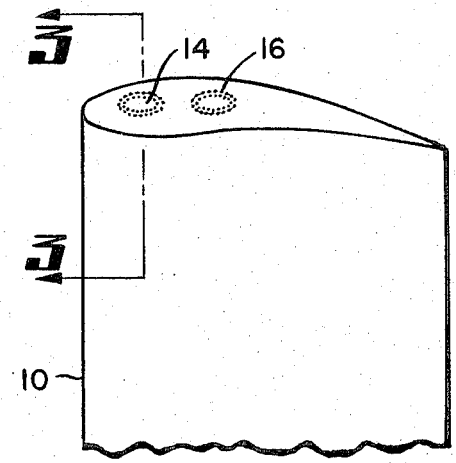
FIG. 2 is a perspective view of the turbine blade after the pin has been bonded thereto; nd
Figure 3:
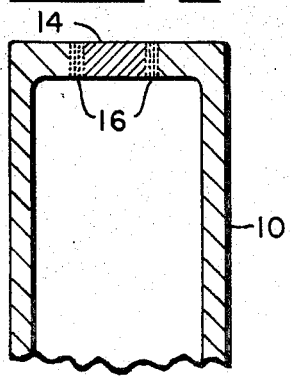
FIG. 3 is a cross-sectional view taken along line 2—2 of FIG. 2.

In the casting of hollow turbine blades shown generally as 10, the holding fixtures used leave corresponding holes or apertures 12 in the blade. The number of holes will depend on the holding fixture used. These holes are undesirable and must be plugged before the turbine blade 10 can be utilized. The common procedure is to place a pin or insert in the hole and weld the pin therein.

In the performance of this invention, a solid pin or insert 14 having an alloy composition with a coefficient of expansion greater than that of the blade alloy is inserted in the hole 12. One example that has been used is a Hastelloy pin and B1910 alloy blades. Prior to insertion, the pin 14 and blade 10 are cleaned by known techniques to remove any surface impurities that may be on the respective surfaces. The cross-sectional dimension or size of the pin is such that the pin has essentially a zero to a slight interface fit such that when the pin is inserted in the blade hole 12, there is a direct pin-to-blade contact. The necessary compressive force for bonding across the pin-blade interface is greatly enhanced because of the extremely tight fit of the pin to the blade and a difference in expansion rates as will be explained herebelow. Any portion of the pin extending above the surface of the balde is then removed, such as by cutting or grinding.

Bonding of the pin 14 to the turbine blade 10 is accomplished by subjecting the pin 14 and blade 10 assemblage to a thermal cycle at elevated temperatures for a predetermined time which depends on the alloys being used. Because of the differing coefficient of expansion of the blade and pin, the elevated temperature will cause a greater expansion of the pin 14 than the turbine blade 10 such that a large compressive force will exist at the interface between the two components. A temperature is used and maintained for a predetermined time such that the blade 10 and pin 14 become united, one to the other in the area shown generally as 16, because of the phenomenon of diffusion bonding of the two metals.

The turbine blade can now be subjected to the coating processes which are described in the aforementioned patent and applications which are incorporated herein by reference. Since the coating processes utilize high temperature cycles, it is possible to utilize the coating process to provide the necessary temperature for the diffusion bonding of the pin to the blade.

From the foregoing description it will be appreciated that the present invention provides a simple and effective method for the bonding of a pin in turbine blades.

While the present exemplary embodiment of this invention has been illustrated and described, it will be recognized that this invention may be otherwise variously embodied and practiced by those skilled in the art.

What is claimed is:

1. A turbine blade which comprises:
   an external body composed of a first material having a predetermined coefficient of expansion, said body defining a hollow interior and being formed with undesirable casting apertures therein; and
   a blade insert composed of a second material having a greater coefficient of expansion than said external body diffusion bonded in said casting apertures, said insert and aperture having a substantially zero interface fit so that there is direct metal-to-metal contact therebetween such that when said body and insert have been subjected to a heat treatment said insert is diffusion bonded to said body due to the differences in coefficients of expansion of the insert and body.

2. A turbine blade as set forth in claim 1 further comprising a coating on said external body and said insert, said coating being secured thereon during the heat treatment.

* * * * *